(12) United States Patent
Gottlieb et al.

(10) Patent No.: US 8,876,943 B2
(45) Date of Patent: Nov. 4, 2014

(54) APPARATUS AND METHODS FOR CHANGING THE CONCENTRATION OF GASES IN LIQUIDS

(75) Inventors: Amos Gottlieb, San Francisco, CA (US); William Kilbridge, Burlingame, CA (US)

(73) Assignee: Random Technologies LLC, San Francisco, CA (US)

( * ) Notice: Subject to any disclaimer, the term of this patent is extended or adjusted under 35 U.S.C. 154(b) by 200 days.

(21) Appl. No.: 13/261,190

(22) PCT Filed: Sep. 13, 2010

(86) PCT No.: PCT/US2010/002500
§ 371 (c)(1),
(2), (4) Date: Feb. 24, 2012

(87) PCT Pub. No.: WO2011/031333
PCT Pub. Date: Mar. 17, 2011

(65) Prior Publication Data
US 2012/0160096 A1    Jun. 28, 2012

Related U.S. Application Data

(60) Provisional application No. 61/276,608, filed on Sep. 14, 2009.

(51) Int. Cl.
*B01D 19/00*    (2006.01)
*B01D 53/22*    (2006.01)
*B01D 63/08*    (2006.01)
*B01D 65/00*    (2006.01)

(52) U.S. Cl.
CPC .......... *B01D 19/0031* (2013.01); *B01D 63/084* (2013.01); *B01D 2313/02* (2013.01); *B01D 2313/04* (2013.01); *B01D 65/003* (2013.01); *Y02C 10/10* (2013.01)
USPC ................................. 95/46; 95/54; 96/6; 96/7

(58) Field of Classification Search
CPC .. B01D 19/00; B01D 19/0031; B01D 63/084; B01D 65/003; B01D 2313/02; B01D 6313/04; B01D 53/22; Y02C 10/10
USPC ........................ 95/46, 47, 51, 54; 96/4, 6, 7, 9
See application file for complete search history.

(56) References Cited

U.S. PATENT DOCUMENTS 3,591,493 A * 7/1971 Zeineh ........................ 210/645
3,751,879 A * 8/1973 Allington ............................ 96/6

(Continued)

FOREIGN PATENT DOCUMENTS

EP    0973031    7/1998
EP    1529560    3/2004

OTHER PUBLICATIONS

International search report and Written Opinion for PCT/US 2010/002500, 2011.

*Primary Examiner* — Jason M Greene
(74) *Attorney, Agent, or Firm* — T. H. P. Richardson

(57) ABSTRACT

Apparatus for changing the concentration of a selected gas in a liquid, the apparatus comprising a flow chamber through which the liquid is passed and which comprises a wall comprising a planar separation membrane, the separation membrane being substantially impermeable to the liquid and permeable to the selected gas, characterized in that the separation member extends beyond the flow chamber and provides a seal between components of the apparatus. The apparatus is particularly useful for degassing liquids, for example HPLC eluents and analysis samples.

19 Claims, 5 Drawing Sheets

(56) References Cited

U.S. PATENT DOCUMENTS

| | | | |
|---|---|---|---|
| 4,422,936 A * | 12/1983 | Riede et al. | 96/7 |
| 4,461,165 A | 7/1984 | Kesson | |
| 5,019,140 A | 5/1991 | Bowser | |
| 5,154,832 A | 10/1992 | Yamamura | |
| 5,183,486 A | 2/1993 | Gatten | |
| 5,340,384 A | 8/1994 | Sins | |
| 5,693,122 A * | 12/1997 | Berndt | 96/6 |
| 5,749,942 A | 5/1998 | Mattis et al. | |
| 5,827,429 A * | 10/1998 | Ruschke et al. | 96/6 |
| 5,876,604 A | 3/1999 | Nemser | |
| 5,980,742 A * | 11/1999 | Saitoh | 95/46 |
| 6,126,723 A * | 10/2000 | Drost et al. | 96/4 |
| 6,241,945 B1 * | 6/2001 | Owen | 422/44 |
| 6,248,157 B1 | 6/2001 | Sims et al. | |
| 6,258,154 B1 | 7/2001 | Berndt et al. | |
| 6,309,444 B1 | 10/2001 | Sims et al. | |
| 6,315,815 B1 | 11/2001 | Spadaccini et al. | |
| 6,494,938 B2 | 12/2002 | Sims et al. | |
| 6,596,058 B2 | 7/2003 | Gerner et al. | |
| 6,709,492 B1 | 3/2004 | Spadaccini et al. | |
| 6,949,132 B2 | 9/2005 | Thielen et al. | |
| 7,022,157 B2 | 4/2006 | Tsai | |
| 7,144,443 B2 | 12/2006 | Gerner et al. | |
| 7,329,305 B2 | 2/2008 | Sloan | |
| 7,393,388 B2 | 7/2008 | Spadaccini et al. | |
| 7,399,345 B2 | 7/2008 | Gerner | |
| 7,427,312 B2 | 9/2008 | Gerner et al. | |
| 7,435,284 B2 | 10/2008 | Piccinini et al. | |
| 7,465,335 B2 | 12/2008 | Schmidt | |
| 7,465,336 B2 | 12/2008 | McHugh | |
| 7,686,590 B2 | 3/2010 | Ishii et al. | |
| 8,016,397 B2 * | 9/2011 | Ito et al. | 347/85 |
| 2005/0079074 A1 | 4/2005 | Ishii et al. | |
| 2005/0098032 A1 * | 5/2005 | Tsai | 95/46 |
| 2007/0095204 A1 | 5/2007 | Gerner et al. | |

* cited by examiner

APPARATUS AND METHODS FOR CHANGING THE CONCENTRATION OF GASES IN LIQUIDS

CROSS-REFERENCE TO RELATED APPLICATION

This application is an application under 35 USC 371 based on PCT/US 2010/002500 and claims priority from U.S. Provisional Application 61/276,608, filed Sep. 14, 2009. The entire disclosure of that application is incorporated herein by reference for all purposes.

FIELD OF THE INVENTION

This invention relates to methods and apparatus for changing the concentration of one or more gases in a liquid.

BACKGROUND OF THE INVENTION

It is known to change the concentration of one or more gases in a liquid by passing the liquid through a chamber having a wall which is composed of a separation membrane which is substantially impermeable to the liquid and permeable to the gas(es). In one application, a liquid which is to be used in an analytical or assay procedure is "degassed" in order to reduce the concentration of dissolved gases and/or gas bubbles in the liquid. In this specification, the term "degassing" is used to include both the removal of dissolved gases and the removal of gas bubbles (which is sometimes referred to in the art as "debubbling"). The liquid can for example be an HPLC eluent or an analytical sample. Reference may be made, for example, to U.S. Pat. Nos. 3,751,879, 4,325,750 4,469,496, 5,183,486, 5,340,384, 5,876,604, 5,693,122, 5,749,942, 5,980,742, 6,248,157, 6,258,154, 6,309,444, 6,315,815, 6,494,938, 6,596,058, 6,709,492, 6,949,132, 7,022,157, 7,399,345, 7,427,312, 7,686,590 and EP 0973031. The entire disclosure of each of those patents is incorporated herein by reference for all purposes.

SUMMARY OF THE INVENTION

We have discovered, in accordance with the present invention, that in apparatus for changing the concentration of a selected gas in a liquid, a planar separation membrane not only (1) can fulfill its recognized function in changing the concentration of the selected gas in the liquid, but also (2) can function as a gasket to provide a seal between components of the apparatus. In the simplest case, the separation membrane is directly contacted and compressed, at right angles to the plane of the separation membrane, between two parallel planar surfaces of components which are to be sealed to each other. Preferably, however, the separation membrane is deformed between the components by forces having a component in the plane of the separation membrane. Such deformation can be produced by including irregularities which extend outwards from one or both of the surfaces which directly contact the separation membrane. In many cases, use of the separation membrane as a gasket can simplify the construction, and/or can improve the performance, of the apparatus. Thus, the present invention provides, in apparatus and methods which make use of a planar separation membrane to change the concentration of a selected gas in a liquid, the improvement of using the separation membrane to provide a seal between components of the apparatus.

The term "separation membrane" is used in this specification to denote a membrane which is substantially impermeable to at least one liquid and through which a gas dissolved in the liquid can pass when the partial pressure of the gas on one side of the membrane is greater than the partial pressure of the gas on the other side of the membrane. For example, the membrane may be substantially impermeable to one or more of water, methyl alcohol, acetonitrile, n-hexane, ink jet fluid, jet fuel or other liquid fuel, but permeable to one or both of oxygen and nitrogen.

In a first preferred aspect, this invention provides apparatus comprising
 (1) a flow plate which comprises (a) a flow plate chamber and (b) a flow plate peripheral member which surrounds the flow plate chamber;
 (2) a selection plate comprising
  (a) an inner selection plate surface which comprises (i) a selection plate base and (ii) selection plate elements which extend from the base, are separated by intercommunicating selection areas, and have outer surfaces remote from the selection plate base; and
  (b) a selection plate peripheral member which (i) surrounds the inner selection plate surface and (ii) extends away from the selection plate base;
 (3) a planar membrane which (a) comprises (i) a membrane transmission section having a first major surface and a second major surface, and (ii) a membrane peripheral member which surrounds the membrane transmission section, and (b) lies between the flow plate chamber and the selection plate;
 (4) the flow plate chamber being at least in part bounded by the first major surface of the membrane transmission section and the flow plate peripheral member;
 (5) an inlet for liquid to enter the flow chamber;
 (6) an outlet for liquid to leave the flow chamber channel;
 (7) a selection channel which is at least in part bounded by the second major surface of the membrane transmission section, the selection plate base, and the selection plate elements; and
 (8) at least one selection plate port for maintaining a selection fluid in the selection channel;
the flow plate peripheral member and the selection plate peripheral member being secured to each other, and the membrane peripheral member (i) being sandwiched between the flow plate peripheral member and the selection plate peripheral member and (ii) directly contacting each of the flow plate peripheral member and the selection plate peripheral member.

In many important uses of the invention, a vacuum is maintained on the selection channel, and the term "maintaining a selection fluid in the selection channel" is used in this specification to include maintaining a vacuum on the selection channel (the selection fluid then being air under reduced pressure, the air also containing gas which has been removed from the liquid through the separation membrane). In other uses, the selection fluid can be another fluid which extracts a gas from the liquid and/or supplies gas to the liquid through the separation membrane.

A first embodiment of the first preferred aspect of the invention is apparatus which comprises
 (1) a flow plate which comprises (a) a flow plate chamber, (b) an inner flow plate surface, and (c) a flow plate peripheral member which (i) surrounds the flow plate chamber, and (ii) extends away from the inner flow plate surface
 (2) a selection plate comprising
  (a) an inner selection plate surface which comprises (i) a selection plate base and (ii) selection plate elements which extend from the base, are separated by intercommunicating selection areas, and have outer surfaces remote from the selection plate base, and (b) a selection plate peripheral member which surrounds the inner selection plate surface and extends away from the selection plate base;

(3) a planar separation membrane which (a) comprises (i) a membrane transmission section having a first major surface and a second major surface, and (ii) a membrane peripheral member which surrounds the membrane transmission section, and (b) lies between the flow plate and the selection plate;

(4) a flow channel which (a) comprises the flow plate chamber, and (b) is at least in part bounded by the first major surface of the membrane transmission section, the flow plate peripheral member and the inner flow plate surface (5) an inlet for liquid to enter the flow channel;

(6) an outlet for liquid to leave the flow channel;

(7) a selection channel which is at least in part bounded by the second major surface of the membrane transmission section, the selection plate base, and the selection plate elements; and (8) at least one selection plate port for maintaining a selection fluid in the selection channel;

the flow plate peripheral member and the selection plate peripheral member being secured to each other, and the membrane peripheral member (a) being sandwiched between the flow plate peripheral member and the selection plate peripheral member and (b) directly contacting each of the flow plate peripheral member and the selection plate peripheral member.

In a first example of this first embodiment, there is a single flow plate, a single selection plate, a single planar membrane, a single flow chamber, and a single selection channel.

In a second example of this embodiment, the apparatus comprises separate first and second selection plates comprising respective first and second selection plate surfaces and respective first and second selection plate peripheral members; separate first and second planar separation membranes having respective first and second membrane peripheral members; separate first and second flow channels; separate first and second selection channels; and a single flow plate which comprises (a) separate first and second flow plate chambers, (b) separate first and second flow plate surfaces on opposite sides of the single flow plate, and (c) first and second flow plate peripheral members which (i) respectively surround the first and second flow plate chambers, and (ii) respectively extend away from the first and second flow plate surfaces;

the first flow plate peripheral member and the first selection plate peripheral member being secured to each other, and the first membrane peripheral member (i) being sandwiched between the first flow plate peripheral member and the first selection plate peripheral member and (ii) directly contacting each of the first flow plate peripheral member and the first selection plate peripheral member, and the second flow plate peripheral member and the second selection plate peripheral member being secured to each other, and the second membrane peripheral member (i) being sandwiched between the second flow plate peripheral member and the second selection plate peripheral member and (ii) directly contacting each of the second flow plate peripheral member and the second selection plate peripheral member.

In this second example, the various first and second components can be the same or different. For example the first and second flow chambers can have the same or different dimensions, and/or the first and second selection channels can have the same or different dimensions; and/or the first and second membranes can be the same or different. Preferably, the first and second flow chambers have the same dimensions, and the first and second selection channels have the same dimensions. In this way, in particular by selecting suitable first and second membranes, different results can be achieved using apparatus which is the same except for the use of different separation membranes. In a variation of this apparatus, one of the membranes is a separation membrane and the other membrane is a membrane which is substantially impermeable both to the liquid and to the selected gas. From a manufacturing viewpoint, it is very convenient to be able to make a single device whose performance can be changed merely by changing the membranes, including (a) the use of a first separation membrane which is effective in degassing the liquid and a second membrane which does not degas or otherwise effect the liquid, and (b) the use of a first separation membrane which removes one gas and a second separation membrane which removes another gas.

A second embodiment of the first preferred aspect of the invention is apparatus which contains two selection channels and two membranes, and a single flow chamber having at least part of each major wall provided by one of said membranes. Thus, in this second embodiment, the apparatus comprises (1) a flow plate which comprises (a) a flow plate chamber and (b) a flow plate peripheral member which surrounds the flow plate chamber;

(2) a first selection plate comprising (a) a first inner selection plate surface which comprises (i) a first selection plate base and (ii) first selection plate elements which extend from the first base, are separated by intercommunicating selection areas, and have outer surfaces remote from the first base; and (b) a first selection plate peripheral member which (i) surrounds the first inner selection plate surface and (ii) extends away from the first base;

(3) a first planar separation membrane which (a) comprises (i) a first membrane transmission section having a first major surface and a second major surface, and (ii) a first membrane peripheral member which surrounds the first membrane transmission section, and (b) lies between the flow plate chamber and the first selection plate;

(4) a second selection plate comprising (a) a second inner selection plate surface which comprises (i) a second selection plate base and (ii) second selection plate elements which extend from the second base, are separated by intercommunicating selection areas, and have outer surfaces remote from the second base; and (b) a second selection plate peripheral member which (i) surrounds the second inner selection plate surface and (ii) extends away from the second base;

(5) a second planar separation membrane which (a) comprises (i) a second membrane transmission section having a first major surface and a second major surface, and (ii) a second membrane peripheral member which surrounds the second membrane transmission section, and (b) lies between the flow plate chamber and the second selection plate;

(6) a flow channel which (a) comprises the flow plate chamber, and (b) is at least in part bounded by the first major surface of the first membrane transmission section, the first major surface of the second membrane transmission section, and the flow plate peripheral member;

(7) an inlet for liquid to enter the flow channel;

(8) an outlet for liquid to leave the flow channel;

(9) a first selection channel which is at least in part bounded by (a) the second major surface of the first membrane transmission section, (b) the first selection plate base, and (c) the first selection plate elements;

(10) a second selection channel which is at least in part bounded by (a) the second major surface of the second membrane transmission section, (b) the second selection plate base, and (c) the second selection plate elements;

(11) at least one first selection plate port for maintaining a selection fluid in the first selection channel; and.

(12) at least one second selection plate port for maintaining a selection fluid in the second selection channel;

the first flow plate peripheral member and the first selection plate peripheral member being secured to each other, and the first membrane peripheral member (a) being sandwiched between the first flow plate peripheral member and the first selection plate peripheral member and (b) directly contacting each of the first flow plate peripheral member and the first selection plate peripheral member; and the second flow plate peripheral member and the second selection plate peripheral member being secured to each other, and the second membrane peripheral member (a) being sandwiched between the second flow plate peripheral member and the second selection plate peripheral member and (b) directly contacting each of the second flow plate peripheral member and the second selection plate peripheral member.

As in the second example of the first embodiment of the invention, the various first and second components in this second embodiment are can be the same or different.

In a second preferred aspect, this invention provides a method for changing the concentration of one or more selected gases in a liquid by passing the liquid through the flow chamber of apparatus according to the first preferred aspect of the invention, the liquid entering the flow chamber through one or more inlets and leaving the flow chamber through one or more outlets, while maintaining a selection fluid in the selection channel. In this method, the separation membrane is substantially impermeable to the liquid and is permeable to the one or more selected gases; and the partial pressure of the selected gas in the liquid in the flow chamber is different from the partial pressure of the selected gas in the selection fluid in the selection channel.

The apparatus and method of the first and second aspects of the invention are particularly useful for degassing a liquid, for example an HPLC eluent, an analytical sample or an inkjet fluid, in which case the selection fluid is a preferably a gas, for example air, under reduced pressure, which is frequently referred to in this specification simply as "a vacuum."

The invention is for example also useful for degassing (e.g. reducing the concentration of oxygen in) a liquid fuel, for example jet fuel; in applications for adding a gas to (including removing one gas from and adding another gas to) a liquid, for example removing $O_2$ from and adding $N_2$ to a liquid fuel, for example jet fuel, or for removing $CO_2$ and adding $O_2$ to cell media in a bioreactor; and in other applications for changing the relative concentrations of different gases in a liquid; and in applications for measuring the content of a gas in a liquid, for example, measurement of the methane content of a drilling oil, and measurement of the carbon dioxide content of ocean water.

In additional preferred aspects, this invention provides components which are suitable for use in the invention, and which are novel and inventive in their own right, including in particular novel flow plates, novel selection plates, and novel separation membranes, as well as novel kits of parts comprising some or all of the components needed for the assembly of apparatus of the first preferred aspect of the invention.

A first such novel component is a planar separation membrane comprising (a) a membrane transmission section, and (b) a membrane peripheral member which surrounds the membrane transmission section, the membrane peripheral member including location features which facilitate the location of the membrane at a desired position relative to another component. The location features can for example be (i) areas which are located at the edge of the membrane peripheral member, for example, areas which form part of the edge of the peripheral member and are for example part of a circle, and/or (ii) areas which are holes in the peripheral member, the holes being for example circular.

A second such novel component is a flow plate which comprises (a) a flow plate chamber, (b) an inner flow plate surface, and (c) a flow plate peripheral member which (i) surrounds the flow plate chamber, (ii) extends away from the inner flow plate surface and (iii) has an inner major surface and an outer major surface, the inner major surface of the flow plate peripheral member comprising at least one irregularity which projects from the inner major surface. The irregularity preferably extends continuously around the peripheral member. The peripheral member preferably also includes a plurality of spaced-apart holes through which rivets or other fastening devices can pass. When there are such spaced-apart holes, an irregularity preferably extends continuously around the peripheral member, between the rivet holes and the inner flow plate surface, and/or between the rivet holes and the outside edge of the peripheral member. Alternatively or additionally, an irregularity can extend around the peripheral member, interrupted by some or all of the spaced-apart holes, but otherwise be continuous. The irregularity may for example have a cross-section which is pointed, square, part-round or chamfered or two or more of these.

A third such novel component is a selection plate which comprises (a) an inner selection plate surface which comprises (i) a selection plate base and (ii) selection plate elements which extend from the base, are separated by intercommunicating selection areas, and have outer surfaces remote from the selection plate base, and (b) a selection plate peripheral member which (i) surrounds the inner selection plate surface, (ii) extends away from the selection plate base, and (iii) has an inner major surface and an outer major surface, the inner major surface of the selection plate peripheral member comprising at least one irregularity which projects from the inner major surface. The irregularity preferably extends continuously around the peripheral member. The peripheral member preferably also includes a plurality of spaced-apart holes through which rivets or other fastening devices can pass. When there are such spaced-apart holes, an irregularity preferably extends continuously around the peripheral member, between the rivet holes and the inner selection plate surface, and/or between the rivet holes and the outside edge of the peripheral member. Alternatively or additionally, an irregularity can extend around the peripheral member, interrupted by some or all of the spaced-apart holes, but otherwise be continuous. The irregularity may for example have a cross-section which is pointed, square, part-round or chamfered or two or more of these.

A fourth such novel component is a selection plate which comprises (a) an inner selection plate surface which comprises (i) a selection plate base and (ii) selection plate elements which extend from the base, are separated by intercommunicating selection areas, and have outer surfaces remote from the selection plate base, the selection plate elements being shaped so that, when a selection membrane is drawn up against the selection plate elements by a vacuum on the selection areas, the surfaces of the selection plate elements which are contacted by the selection membrane free from abrupt changes, for example, as further described below. Such selection plates are useful in apparatus and methods which make use of a planar separation membrane to change the concentration of a selected gas in a liquid, whether or not the planar separation member provides a seal between components of the apparatus. Thus, the invention provides, in a further aspect, apparatus and methods which make use of a planar separation member to change the concentration of a selected gas in a liquid, wherein the planar separation member contacts selection plate elements as defined in the first sentence of this paragraph, whether or not the planar separation member also provides a seal between components of the apparatus.

One example of such a novel kit of parts comprises the needed flow plate(s) and selection plate(s) but not the separation membrane(s), which would then be selected according to the needs of the particular application before assembling the complete apparatus. Another example of such a novel kit of parts comprises the needed flow plate(s) and selection plate(s), and a set of separation membranes from which the appropriate membrane(s) would be selected according to the needs of the particular application before assembling the complete apparatus.

We have further discovered that the use of a flow chamber which has a very small depth and a very high aspect ratio (for example as further disclosed below as possible features of the flow chamber) provides unexpected advantages. We believe, though the invention is not dependent upon the correctness of that belief, that this is because gas bubbles in the liquid are forced to assume a "squashed" configuration which (by comparison with the normal spherical configuration) increases the rate at which the gas can be removed from the liquid through the separation member. Thus, the invention provides, in a further aspect, apparatus and methods which make use of a planar separation member to change the concentration of a selected gas in a liquid, wherein the flow chamber is as defined above, whether or not the planar separation member also provides a seal between components of the apparatus.

BRIEF DESCRIPTION OF THE DRAWINGS

The invention is illustrated in the accompanying drawings, which are diagrammatic in nature and are not to scale, and in which.

DETAILED DESCRIPTION OF THE INVENTION

Figure 1:
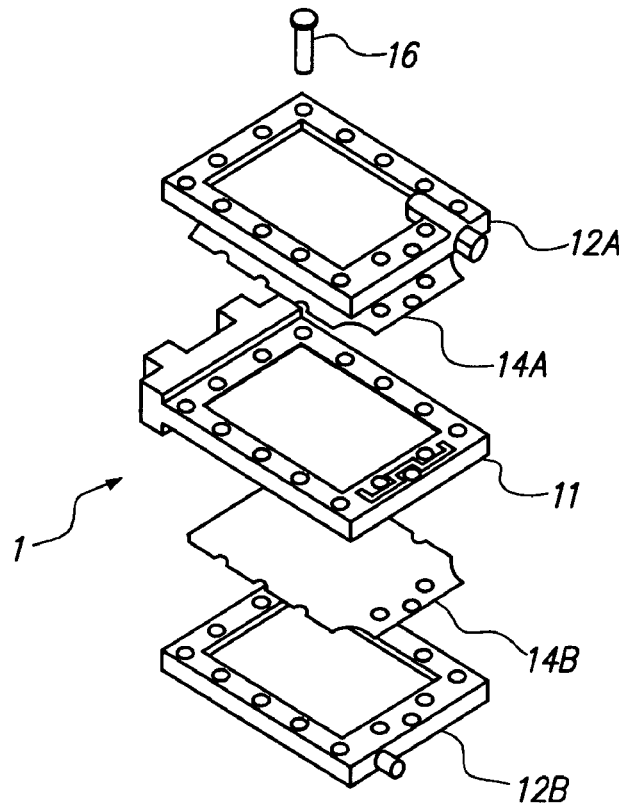
FIG. 1 is a perspective view of the components of an apparatus of the invention before they are assembled.

In the Summary of the Invention above, the Detailed Description of the Invention below, and the accompanying drawings, reference is made to particular features (including for example components, ingredients, elements, devices, apparatus, systems, groups, ranges, method steps, test results, etc.) of the invention. It is to be understood that the disclosure of the invention in this specification includes all possible combinations of such particular features. For example, where a particular feature is disclosed in the context of a particular aspect, a particular embodiment, a particular claim, or a particular Figure, that feature can also be used, to the extent appropriate, in the context of other particular aspects, embodiments, claims and Figures, and in the invention generally. The invention disclosed and claimed in this specification includes embodiments not specifically described herein and can for example make use of features which are not specifically described herein, but which provide functions which are the same, equivalent or similar to, features specifically disclosed herein.

The term "comprises" and grammatical equivalents thereof are used herein to mean that, in addition to the features specifically identified, other features are optionally present. For example, an apparatus "comprising" (or "which comprises") elements A, B and C can contain only elements A, B and C, or can contain not only elements A, B and C but also one or more other elements. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example, "from 8 to 20 inches" or "8-20 inches" means a range whose lower limit is 8 inches, and whose upper limit is 20 inches. The terms "plural", "multiple", "plurality" and "multiplicity" are used herein to denote two or more than two features.

Where reference is made herein to a method comprising two or more defined steps, the defined steps can be carried out in any order or simultaneously (except where the context excludes that possibility), and the method can optionally include one or more other steps which are carried out before any of the defined steps, between two of the defined steps, or after all the defined steps (except where the context excludes that possibility). Where reference is made herein to "a" or "an" feature, this includes the possibility that there are two or more such features (except where the context excludes that possibility). Where reference is made herein to two or more features, this includes the possibility that the two or more features are replaced by a lesser number or greater number of features providing the same function (except where the context excludes that possibility). The numbers given herein should be construed with the latitude appropriate to their context and expression; for example, each number is subject to variation which depends on the accuracy with which it can be measured by methods conventionally used by those skilled in the art.

In this specification, parts and percentages are by weight, except where otherwise noted. Temperatures are in degrees Centigrade (° C.).

This specification incorporates by reference all documents referred to herein and all documents filed concurrently with this specification or filed previously in connection with this application, including but not limited to such documents which are open to public inspection with this specification.

It is usually preferable for the flow plate(s) and the selection plate(s) to have generally planar configurations, though the invention includes the possibility that one or more of them is not generally planar. Thus, preferred apparatus has one or more of the following features:—

(1) the flow plate chamber lies substantially in a plane, and is preferably a rectangular parallelepiped whose depth is substantially less than its width and its length;

(2) the flow plate peripheral member has an outer surface which lies in a plane;

(3) the flow plate peripheral member lies substantially in a plane having a depth substantially equal to the depth of the flow plate chamber;

(4) when the flow plate has an inner flow plate surface (i.e. in the first and second embodiments of the first preferred aspect of the invention), the inner flow plate surface lies substantially in a plane;

(5) the selection plate base lies substantially in a plane;

(6) the outer surfaces of the selection plate elements which extend from the base lie substantially in a plane;

(7) the selection plate peripheral member has an outer surface which lies substantially in a plane, and preferably the outer surfaces of the selection plate elements which extend from the base lie in the same plane; and (8) the intercommunicating selection areas of the selection plate lie substantially in a plane.

Particularly preferred apparatus has all of these features, with the various planes being parallel to each other.

The plan shape of the flow plate(s) and the selection plate(s), i.e. their shape when viewed in plan, can be any shape. However, it is generally convenient for them to have a generally rectangular (including square) plan shape and for all the flow plate(s) and the selection plate(s) to have substantially the same plan shape. Generally, the length dimension (i.e. the dimension in the direction in which the liquid flows) of the rectangular shape is greater than, e.g. 1.1-2.0 times, the width dimension One technology for which this invention is particularly valuable is the degassing of eluents for HPLC columns, and the information below, and the accompanying drawings and the description of the drawings are directed to apparatus which is particularly suitable for such use. However, those skilled in the art will have no difficulty, having regard to their own knowledge and the disclosure herein, in making use of the invention in other fields, for example as identified above.

The various aspects of the invention can make use of one or more of the following optional features.

(1) the flow chamber has an aspect ratio (width to height) of at least 25:1, preferably at least 250:1, up to for example 3,000:1, with values of 100:1-500:1, e.g. 200:1-400:1, often being preferred. The flow chamber has a height of 0.00025-0.01, e.g. 0.0025-0.0055 or 0.0035-0.005, inch, and preferably a width of 0.5 to 5, e.g. 1-2, inch.

(2) the flow chamber has a length of 1.5-4.0, e.g. 2.5-4.0 inch (38-102 mm, e.g. 63-102 mm).

We have found that the combination of features (1) and (2) can provide a particularly useful combination of small dead volume and low back pressure.

(3) The dead volume of the apparatus is low, for example, in some embodiments, less than 600 µL, preferably less than 550 µL.

(4) The pressure in the flow chamber is up to 150, e.g. 10-100, psi (up to 10.5, e.g. 7-70, kilograms per square centimeter), or as much 125-150 psi (8.75-kilograms per square centimeter) above ambient atmospheric pressure.

(5) The membrane has a permeability to oxygen of at least 25,000 centiBarrer, preferably at least 60,000 centiBarrer.

(6) The membrane is composed of Teflon AF 2400 or another copolymer of tetrafluoroethylene and perfluoro-1,3-dioxole.

(7) The membrane is composed of a copolymer of perfluoro-1,3-dioxole and a perfluoro monomer other than tetrafluoroethylene.

(8) The membrane is less than 2.5 mil (63µ) thick, preferably less than 2.0 mil (51µ) thick, for example is 10-45µ thick.

(9) The flow plate is a single monolithic article, e.g. a molded article.

(10) The selection plate is a single monolithic article, e.g. a molded article.

(11) The flow plate and the selection plate are composed of the same material, the material being one which is inert to the gas-containing liquid, for example a polymeric material, e.g. a polyether ether ketone (e.g. PEEK), or a metal, e.g. aluminum or steel. This reduces or removes the danger that, if the temperature changes, e.g. when aviation fluids are being processed, the components will shrink or expand at different rates, resulting in leakage because the seals between the components are compromised.

(12) The selection plate port is connected to a vacuum so that the pressure on the selection areas of the membrane is 20-30, e.g. 26-28, inch Hg, (67.5-102, e.g. 88-95, centibar) or at least 28.5 inch water (7.1 centibar).

(13) The apparatus comprises two or more selection plate ports.

(14) The selection channel comprises an inlet port through which a selection gas can be supplied, the selection gas comprising one or more selected gaseous ingredients which are chosen to control the amounts of those ingredients which are removed from or added to the liquid passing through the flow channel.

(15) In the selection plate, the ratio of the total area of the selection plate elements to the total area of the selection areas is from 25 to 75, e.g. 40 to 60.

(16) The selection areas have a width of 0.01 to 0.03 inch, e.g. 0.015 to 0.025 inch (0.25-0.75, e.g. 0.4-0.64 mm).

(17) The height of the selection plate elements is 0.001-0.05, e.g. 0.01-0.02, inch (0.025-1.25, e.g. 0.25-0.51, mm).

(18) The selection plate elements, which can be arranged in any way which results in selection areas which communicate with the selection port, are rectangular (including square) or round islands, for example square islands arranged in straight rows at right angles to each other. In other exemplary embodiments, the selection plate elements are selected from concentric circles, spirals, crosses and squares within squares, all interrupted by selection areas which communicate with the selection port.

(19) The selection plate elements are shaped so that, when a selection membrane is drawn up against the selection plate elements by a vacuum on the selection areas, the surfaces of the selection plate elements which are contacted by the selection membrane are free from abrupt changes. In one example, at least one cross-section through the selection plate element, and, when the selection plate element is an island, preferably both the cross-sections through the selection plate element which are at right angles to each other, comprise two edge faces each of which is substantially perpendicular to the selection plate base and an outer face which is substantially parallel to the selection plate base, and the outer face is connected to each of the edge faces by a curved line, for example a quarter of a circle or of an ellipse. In another example, the selection plate is corrugated so that the outer surfaces of the corrugations provide the selection plate elements and the inner surfaces of the corrugations provide the intercommunicating selection areas. The corrugations can be regular or irregular. For example, the selection plate elements can be provided by relatively narrow corrugations and the selection areas by relatively wide corrugations, or vice versa.

(20) At least one of the flow plate peripheral member and the selection plate peripheral member, which are secured to each other, with the membrane peripheral member sandwiched between them, has an upstanding irregularity which is slightly higher than, for example 0.00025-0.010 inch (0.006-0.25 mm) higher than, e.g. 0.001-0.0045 inch (0.025-0.12 mm) higher than, the face of the peripheral member.

The presence of such an upstanding irregularity improves the quality of the seal which is provided by the separation membrane between the peripheral members. The upstanding irregularity is preferably a continuous feature around the entire peripheral member. There can be two upstanding irregularities, which can be the same or different, preferably parallel to each other, on one of the peripheral members. The face of the second, opposite peripheral member can be free of irregularities, or can comprise an upstanding irregularity, or can comprise a depression which cooperates with an upstanding irregularity on the face of the first peripheral member. When the flow plate and the selection plate are joined together by rivets or other fastening devices which pass through holes in the peripheral members, preferably at least one upstanding irregularity is inside the fastening devices, and there may be a second upstanding irregularity outside the fastening devices. The irregularity may for example have a cross-section which is pointed, square, part-round or chamfered or two or more of these. The irregularity may be narrow enough to convert substantially all the forces exerted on the faces onto a relatively small area. The membrane undergoes deformation (which may be plastic or elastic deformation) in the area of the upstanding feature. A seal formed in this manner is sometimes referred to as a knife edge seal.

(21) The apparatus is free of compression seals other than the seal(s) involving the separation membrane

(22) The membrane includes location features, e.g. peripheral, cut-outs, which cooperate with corresponding features on the flow plate and/or the selection plate so that the membrane is correctly located. Particular examples of such location features are disclosed above

(23) The pressure drop between the inlet and the outlet of the flow chamber is less than 0.04 psi (0.0028 kg/square centimeter).

(24) The flow plate peripheral member(s) and the selection plate peripheral member(s) are secured together by means of rivets which pass through holes in the peripheral members. The rivets should be applied in a way such that the stresses are evenly distributed over the periphery of the apparatus. We have found that an effective seal can be achieved with rivets and that rivets can be conveniently used in manufacturing processes. Any other effective method of securing the peripheral members together can be used, including, but not limited to, securing devices which pass through holes in the peripheral members.

(25) When the components of the apparatus are being assembled, positioning of the membrane is assisted by placing the membrane adjacent to the selection plate while drawing a vacuum on the open areas of the support. The vacuum can be supplied through the selection plate port.

Referring now to the drawings, the following reference numerals are used to indicate different components of the apparatus.
1 assembled apparatus
11 flow plate.
111 flow plate peripheral member
1111 upstanding irregularity on the flow plate peripheral member.
112, 112A, 112B flow plate chamber
113, 113A, 113B inner flow plate surface
114, 114A, 114B inlet to flow chamber
115, 115A, 115B outlet from flow chamber
12, 12A, 12B selection plates.
121 selection plate peripheral member
122 selection plate elements which extend from the selection plate base
123 intercommunicating selection areas
124, 124A, 124B vacuum port in the selection plate.
14, 14A, 14B the separation membranes
141 separation membrane location features
16 rivets.
18 rivet holes.

Figure 2:
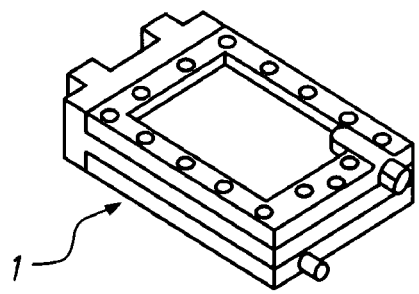
FIG. 2 is a perspective view of an apparatus of the invention prepared by assembling the components of FIG. 1.
Figure 3:
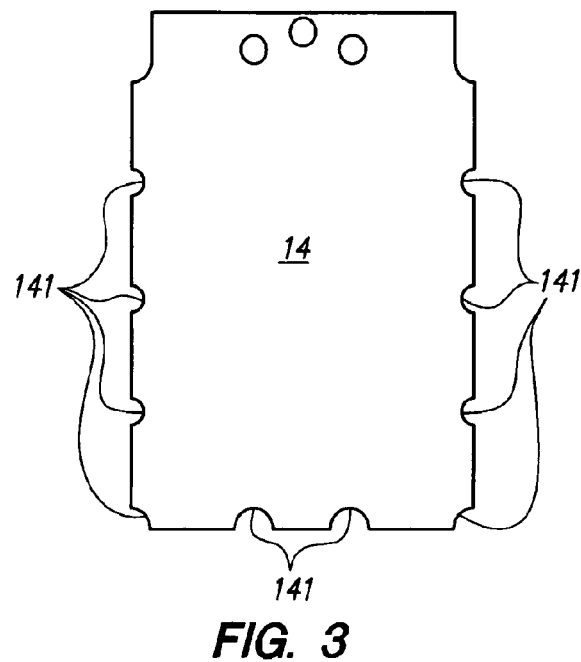
FIG. 3 is a plan view of a separation membrane for use in the invention.
Figure 4:
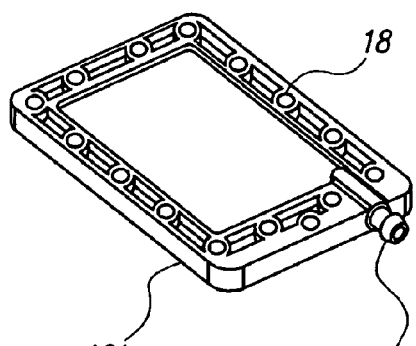
FIG. 4 is a perspective view of the top of a selection plate for use in the invention.
Figure 5:
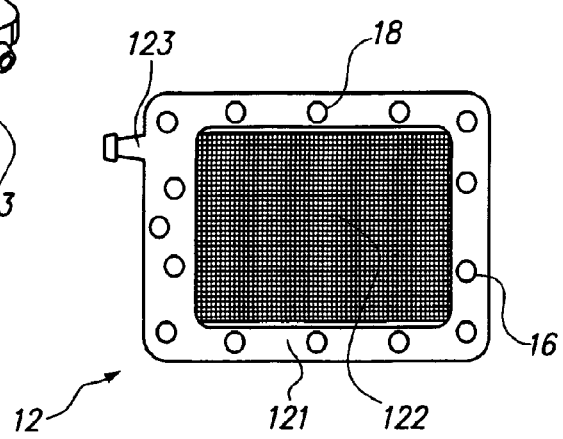
FIG. 5 is a bottom view of a selection plate for use in the invention.
Figure 6:
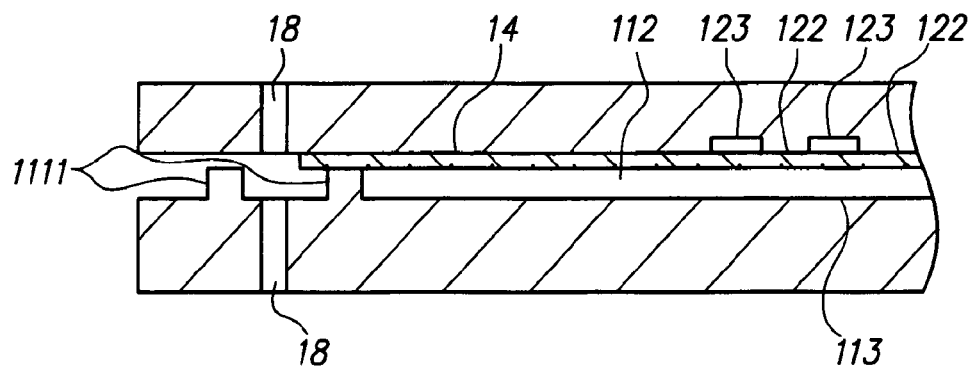
FIG. 6 is a cross-sectional view of a part of the selection plate peripheral membrane, the membrane peripheral member and the flow plate peripheral member in an apparatus of the invention, before the selection plate peripheral member and the flow plate peripheral member are secured together
Figure 7:
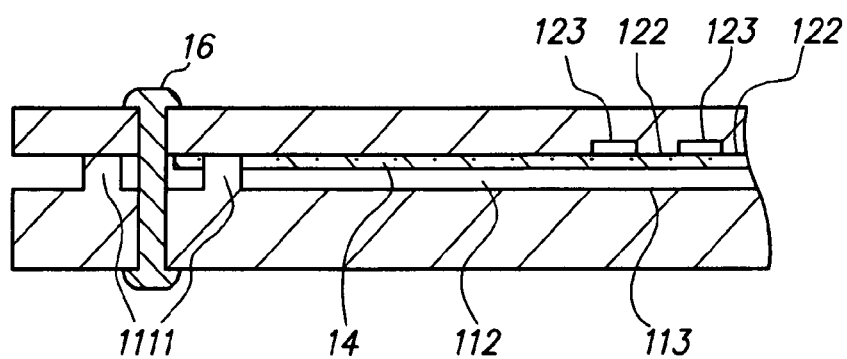
FIG. 7 is a cross-sectional view of the components of FIG. 6 after the peripheral members have been secured together.
Figure 8:
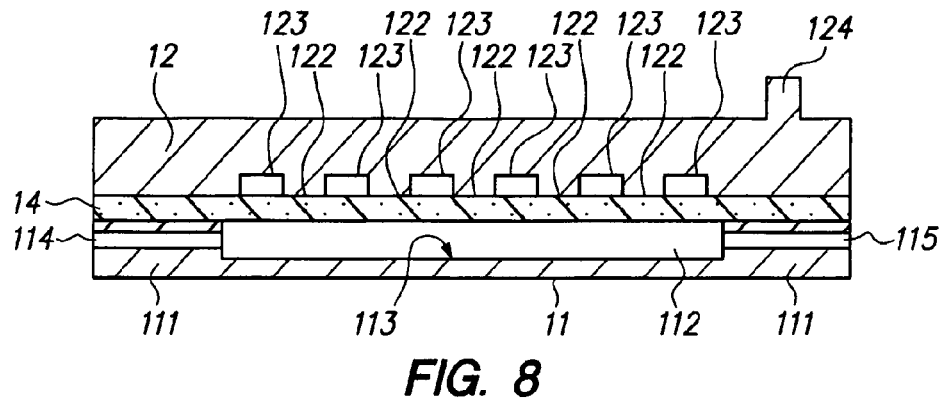
FIGS. 8, 9 and 10 are cross-sectional views of apparatus of the invention.
Figure 9:
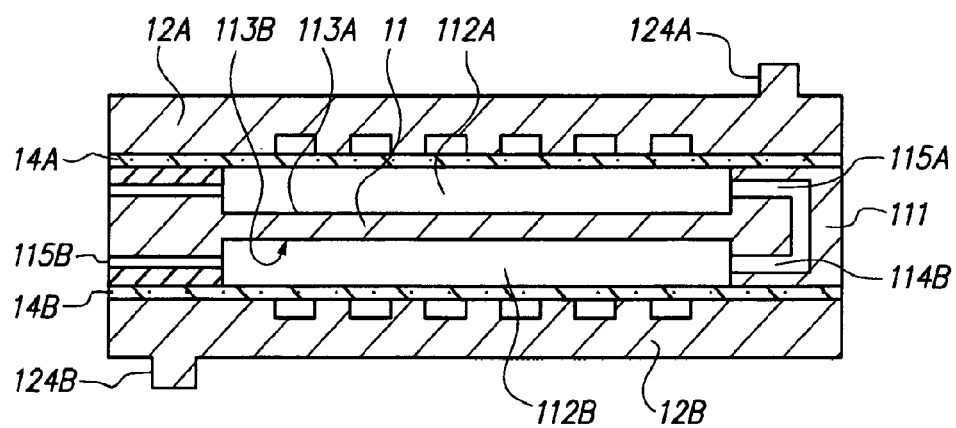
Figure 10:
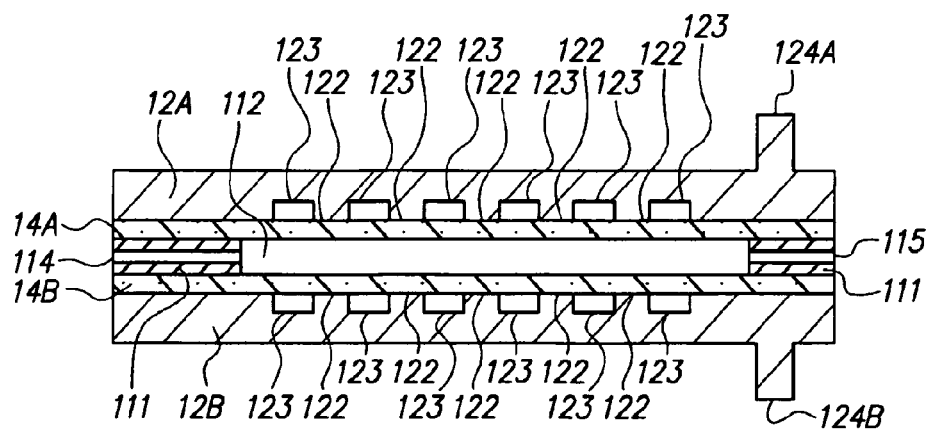
Figure 11A:
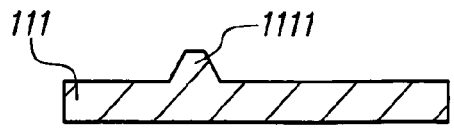
FIGS. 11A-11F are cross-sectional views of peripheral members having upstanding irregularities.
Figure 11B:
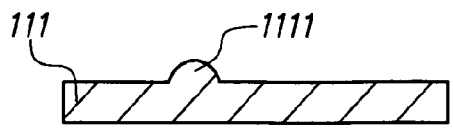
Figure 11C:
Figure 11D:
Figure 11E:
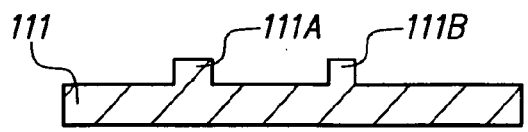
Figure 11F:
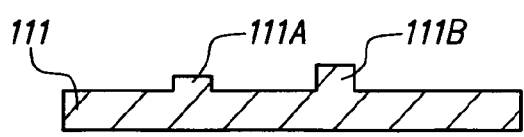
Figure 12:
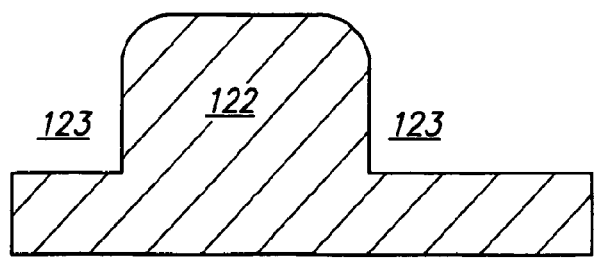
FIG. 12 is a cross-sectional view of a selection plate elements extending from the selection plate base.

FIG. 1 shows the principal components of the apparatus prior to assembly, and FIG. 2 shows the components of FIG. 1 assembled. FIG. 3 shows a separation membrane with location features around the periphery. FIGS. 4 and 5 show, respectively, a top view and a bottom view of a selection plate. FIGS. 6 and 7 show the peripheral members of the flow plate and the selection plate immediately before (FIG. 6) and after (FIG. 7) the flow plate and the selection plate have been secured together by rivets. FIG. 8 is a cross-section through an apparatus which comprises a single flow plate, a single selection plate, a single separation membrane, a single flow chamber, and a single selection channel. FIG. 9 is a cross-section through an apparatus which comprises a single flow plate having two inner flow plate surfaces, two selection plates, two separation membranes, two flow chambers and two selection channels with the outlet from the first flow channel being connected to the inlet to the second flow channel. FIG. 10 is a cross-section through an apparatus which comprises a single flow plate which consists essentially of the peripheral member, the inlet and the outlet, two selection plates, two separation membranes, a single flow chamber and two selection channels. FIGS. 11A-11F are cross-sections through peripheral members having different upstanding irregularities. FIG. 12 is a cross-section through a selection plate element.

The invention claimed is:

1. Apparatus for changing the concentration of a selected gas in a liquid, the apparatus comprising
  (A) a flow plate comprising
    (i) a flow chamber through which the liquid can be passed, and which has a width and a height such that the ratio of the width to the height is at least 25:1,
    (ii) a flow plate peripheral member which surrounds the flow plate chamber,
    (iii) an inlet for liquid to enter the flow chamber, and
    (iv) an outlet for liquid to leave the flow chamber;
  (B) a selection channel which comprises a selection plate and a selection plate port for maintaining a selection fluid in the selection channel, the selection plate comprising
    (i) an inner selection plate surface, the inner selection plate surface comprising a selection plate base and selection plate elements which (a) extend from the base, (b) are separated by intercommunicating selection areas which communicate with the selection plate port, and (c) have outer surfaces remote from the selection plate base, and
(ii) a selection plate peripheral member,
(C) a planar separation membrane which
(i) is substantially impermeable to the liquid and permeable to the selected gas,
(ii) comprises a membrane transmission section having a first major surface and a second major surface, and
(iii) a membrane peripheral member which surrounds the membrane transmission section;
wherein
(1) the flow chamber is at least in part bounded by the first major surface of the membrane transmission section and the flow plate peripheral member,
(2) the selection channel is at least in part bounded by the second major surface of the membrane transmission section, the selection plate base and the selection plate elements, and
(3) the peripheral member of the planar separation membrane (a) lies between the flow plate peripheral member and the selection plate peripheral member and (b) provides a seal between flow plate peripheral member and the selection plate peripheral member.

2. Apparatus according to claim 1 wherein the membrane peripheral member is sandwiched between the flow plate peripheral member and the selection plate peripheral member and directly contacts each of the flow plate peripheral member and the selection plate peripheral member.

3. Apparatus according to claim 1 which comprises a single said flow plate, a single said selection plate, a single said planar membrane, a single said flow channel, and a single said selection channel.

4. Apparatus according to claim 1 which comprises separate first and second said selection plates comprising respective first and second selection plate surfaces and respective first and second selection plate peripheral members; separate said first and second planar separation membranes having respective first and second membrane peripheral members; separate first and second said selection channels; and a single said flow plate which comprises (a) separate first and second flow plate chambers, (b) separate first and second flow plate surfaces on opposite sides of the single flow plate, and (c) first and second flow plate peripheral members which (i) respectively surround the first and second flow plate chambers, and (ii) respectively extend away from the first and second flow plate surfaces;
the first flow plate peripheral member and the first selection plate peripheral member being secured to each other, and the first membrane peripheral member (i) being sandwiched between the first flow plate peripheral member and the first selection plate peripheral member and (ii) directly contacting each of the first flow plate peripheral member and the first selection plate peripheral member and providing a seal between them, and
the second flow plate peripheral member and the second selection plate peripheral member being secured to each other, and the second membrane peripheral member (i) being sandwiched between the second flow plate peripheral member and the second selection plate peripheral member and (ii) directly contacting each of the second flow plate peripheral member and the second selection plate peripheral member and providing a seal between them.

5. Apparatus according to claim 1 which comprises
(1) a single said flow plate,
(2) a first said selection plate comprising
(a) a first said inner selection plate surface and
(b) a first said selection plate peripheral member,
(3) a first said planar separation membrane which comprises a first said membrane peripheral member,
(4) a second said selection plate comprising
(a) a second said inner selection plate surface; and
(b) a second said selection plate peripheral member, and
(5) a second said planar separation membrane which comprises a second membrane transmission section;
wherein
(1) the single flow chamber is at least in part bounded by the first major surface of the first membrane transmission section, the first major surface of the second membrane transmission section, and the flow plate peripheral member;
(2) the first flow plate peripheral member and the first selection plate peripheral member are secured to each other, and the first membrane peripheral member (a) is sandwiched between the first flow plate peripheral member and the first selection plate peripheral member and (b) directly contacts each of the first flow plate peripheral member and the first selection plate peripheral member and provides a seal between them; and
(3) the second flow plate peripheral member and the second selection plate peripheral member are secured to each other, and the second membrane peripheral member (a) is sandwiched between the second flow plate peripheral member and the second selection plate peripheral member and (b) directly contacts each of the second flow plate peripheral member and the second selection plate peripheral member and provides a seal between them.

6. Apparatus according to claim 1 wherein
(A) the flow plate chamber has a height of 0.00025 to 0.01 inch and a width of 0.5 to 5 inch, the width and the height being such that the ratio of the width to the height is at least 250:1, and
(B) the flow plate chamber has a length of 1.5 to 4.0 inch.

7. Apparatus according to claim 1 wherein the flow plate chamber lies substantially in a plane and is a rectangular parallelepiped having a depth which is substantially less than its width and its length.

8. Apparatus according to claim 1 wherein the flow plate is a single monolithic article, the selection plate is a single monolithic article, and each of the flow plate and the selection plate has a generally rectangular shape when viewed in plan, the shape having a width which is 1.1 to 2.0 times the dimension in the direction in which the liquid flows.

9. Apparatus according to claim 1 wherein the flow chamber has a width and a height such that the ratio of the width to the height is at least 250:1.

10. Apparatus for changing the concentration of a selected gas in a liquid, the apparatus comprising
(A) a flow plate comprising
(i) a flow chamber through which the liquid can be passed,
(ii) a flow plate peripheral member which surrounds the flow plate chamber,
(iii) an inlet for liquid to enter the flow channel; and
(iv) an outlet for liquid to leave the flow channel;
(B) a selection channel which comprises a selection plate and at least one selection plate port for maintaining a selection fluid in the selection channel, the selection plate comprising
(i) an inner selection plate surface, the inner selection plate surface comprising a selection plate base and selection plate elements which (a) extend from the base, (b) are separated by intercommunicating selection areas which communicate with the selection plate port, and (c) have outer surfaces remote from the selection plate base, and
 (ii) a selection plate peripheral member,
(C) a planar separation membrane which
 (i) is substantially impermeable to the liquid and permeable to the selected gas,
 (ii) comprises a membrane transmission section having a first major surface and a second major surface, and
 (iii) a membrane peripheral member which surrounds the membrane transmission section;
 wherein
 (1) the flow chamber is bounded by the first major surface of the membrane transmission section and the flow plate peripheral member,
 (2) the selection channel is bounded by the second major surface of the membrane transmission section, the selection plate base, the selection plate elements, and the at least one selection plate port; and
 (3) the peripheral member of the planar separation membrane lies between the flow plate peripheral member and the selection plate peripheral member and provides a seal between flow plate peripheral member and the selection plate peripheral member.

11. Apparatus according to claim 10 wherein the flow plate chamber lies substantially in a plane and is a rectangular parallelepiped having a depth which is substantially less than its width and its length.

12. Apparatus according to claim 10 wherein each of the flow plate and the selection plate has a generally rectangular shape when viewed in plan, the shape having a dimension in the direction in which the liquid flows and a width which is 1.1 to 2.0 times the dimension in the direction in which the liquid flows.

13. Apparatus according to claim 10 wherein the flow chamber has a width and a height such that the ratio of the width to the height is at least 25:1.

14. A method for changing the concentration of one or more selected gases in a liquid, the method comprising passing the liquid through the flow channel of apparatus as claimed in claim 1, the separation membrane being substantially impermeable to the liquid and permeable to the one or more selected gases; and the partial pressure of the selected gas in the liquid in the flow channel being different from the partial pressure of the selected gas in the selection channel.

15. A method according to claim 14 wherein the liquid is an HPLC eluent and the selection channel contains air under reduced pressure.

16. A method according to claim 14 wherein the liquid is a jet fuel.

17. A method for changing the concentration of one or more selected gases in a liquid, the method comprising passing the liquid through the flow channel of apparatus as claimed in claim 10, the separation membrane being substantially impermeable to the liquid and permeable to the one or more selected gases; and the partial pressure of the selected gas in the liquid in the flow channel being different from the partial pressure of the selected gas in the selection fluid in the selection channel.

18. Apparatus for changing the concentration of a selected gas in a liquid, the apparatus comprising
 (A) a flow plate comprising
 (i) a flow chamber through which the liquid can be passed,
 (ii) a flow plate peripheral member which surrounds the flow plate chamber,
 (iii) an inlet for liquid to enter the flow chamber; and
 (iv) an outlet for liquid to leave the flow chamber;
 (B) a selection channel which comprises a selection plate, a selection plate port for maintaining a selection fluid in the selection channel, and a selection plate peripheral member,
 (C) a planar separation membrane (a) which is substantially impermeable to the liquid and permeable to the selected gas (b) which comprises a separation membrane transmission section which forms a wall of the flow chamber and (c) comprises a separation membrane peripheral member
wherein
(1) the separation membrane peripheral member is sandwiched between and directly contacts the flow plate peripheral member and the selection plate peripheral member, and provides a seal between them, and
(2) at least one of the flow plate peripheral member and the selection plate peripheral member has an upstanding irregularity (a) which is 0.0025 to 0.010 inch higher than the face of the peripheral member and is a continuous feature around the entire peripheral member, and (b) around which the separation membrane peripheral member is deformed.

19. Apparatus according to claim 18 wherein the separation membrane
 (1) is less than 2.0 mil thick, and
 (2) consists essentially of a copolymer of perfluoro-1,3-dioxole and tetrafluoroethylene or a copolymer of perfluoro-1,3-dioxole and a perfluoro monomer other than tetrafluoroethylene.

* * * * *